United States Patent
Ogawa

(10) Patent No.: US 12,064,963 B2
(45) Date of Patent: Aug. 20, 2024

(54) PRINTING SYSTEM, METHOD OF CONTROLLING PRINTING SYSTEM, AND STORAGE MEDIUM

(71) Applicant: CANON KABUSHIKI KAISHA, Tokyo (JP)

(72) Inventor: Katsuya Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 17/874,415

(22) Filed: Jul. 27, 2022

(65) Prior Publication Data

US 2023/0032800 A1    Feb. 2, 2023

(30) Foreign Application Priority Data

Jul. 30, 2021   (JP) ................................. 2021-125889

(51) Int. Cl.
   *B41J 3/36*     (2006.01)
   *B41J 2/045*    (2006.01)
   *H04N 1/107*    (2006.01)

(52) U.S. Cl.
   CPC ....... *B41J 2/04508* (2013.01); *B41J 2/04586* (2013.01); *B41J 3/36* (2013.01); *H04N 1/107* (2013.01)

(58) Field of Classification Search
   CPC ...... B41J 2/04508; B41J 2/04586; B41J 3/36; H04N 1/107
   See application file for complete search history.

(56) References Cited

U.S. PATENT DOCUMENTS

| | | | |
|---|---|---|---|
| 5,561,500 A | 10/1996 | Ohzeki et al. | |
| 5,729,785 A | 3/1998 | Sakaizawa et al. | |
| 10,377,157 B2 | 8/2019 | Suzuki | |
| 10,742,828 B2 | 8/2020 | Ogawa | |
| 2018/0170080 A1* | 6/2018 | Suzuki | B41J 25/001 |
| 2019/0091997 A1* | 3/2019 | Shinohara | B41J 2/0458 |

FOREIGN PATENT DOCUMENTS

| | | | | |
|---|---|---|---|---|
| EP | 1452490 A1 * | 9/2004 | ............. | B41J 2/161 |
| JP | 2018-099825 A | 6/2018 | | |

* cited by examiner

*Primary Examiner* — Yaovi M Ameh
(74) *Attorney, Agent, or Firm* — Venable LLP

(57) ABSTRACT

In an image processing apparatus according to the present disclosure, a printing system includes a movement detection unit that detects scanning, which is movement in a first direction, and an operation of making a line break, which is movement in a second direction crossing the first direction, of a printing apparatus main body that includes a printing unit that performs printing on a printing medium. The printing system further includes a notification unit that selectively makes first notification that prompts scanning along with printing by the printing unit, second notification that prompts scanning along with no printing by the printing unit, and third notification that prompts the operation of making a line break, in accordance with a detection result of the printing unit.

14 Claims, 15 Drawing Sheets

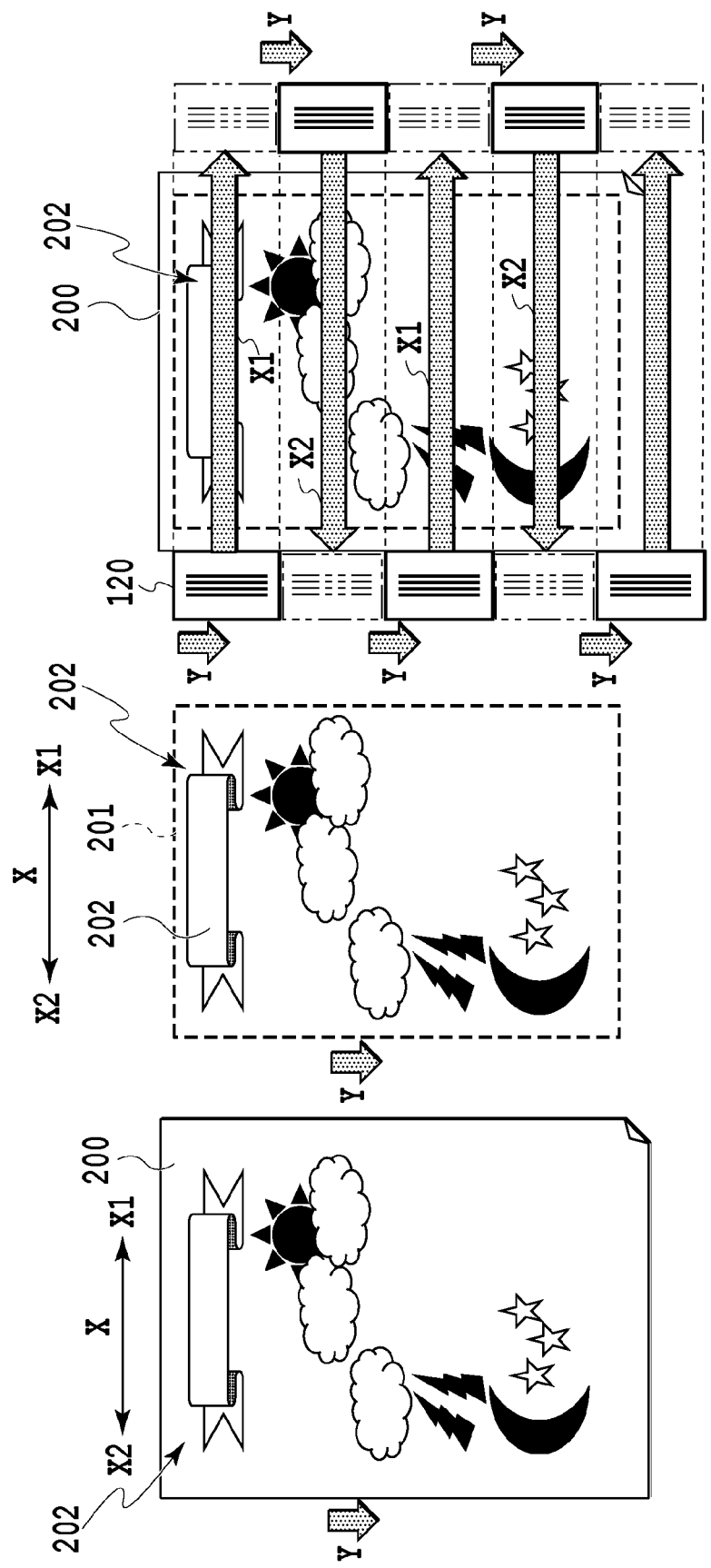

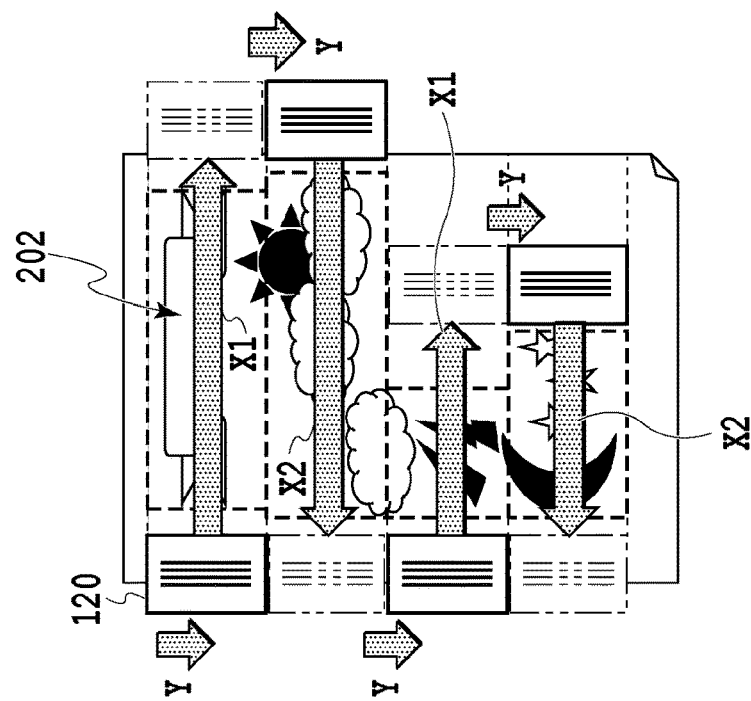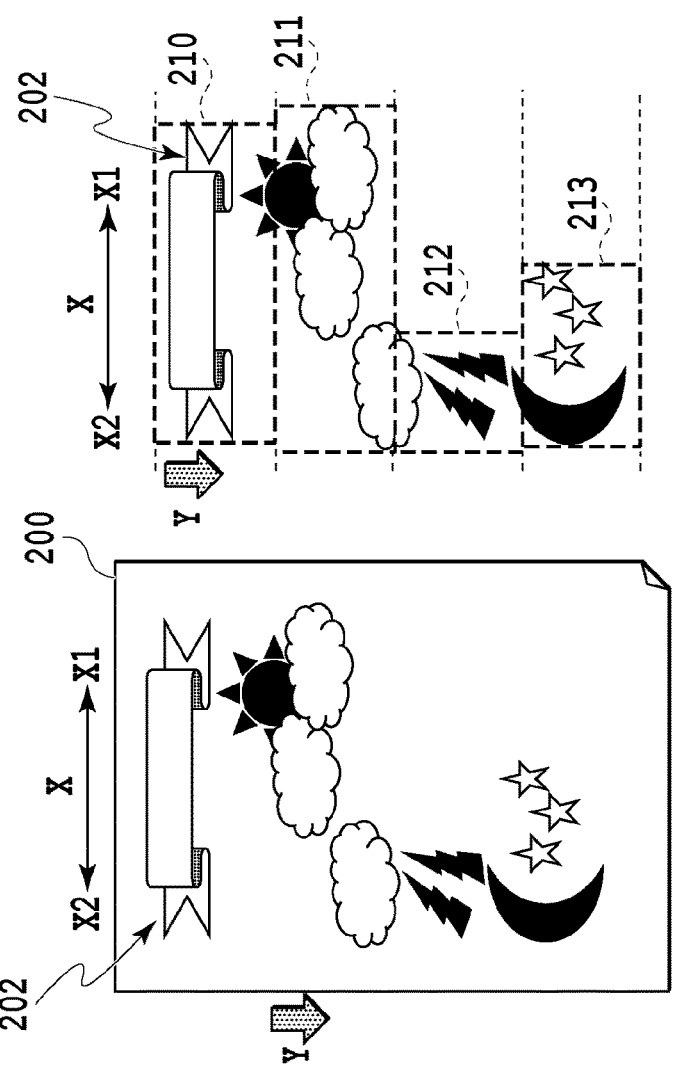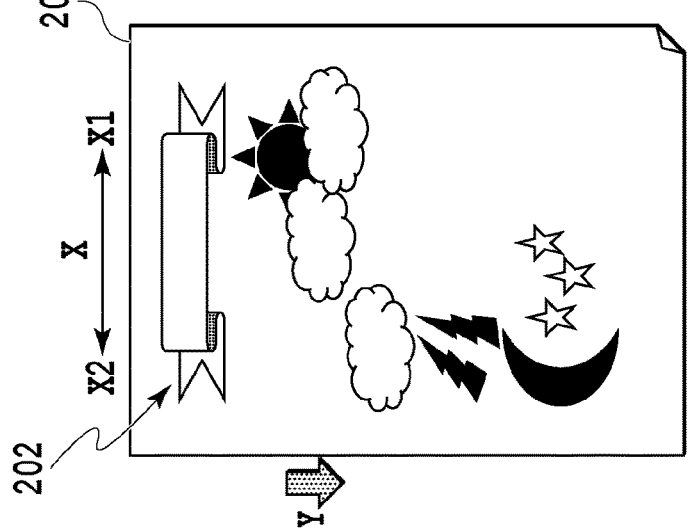

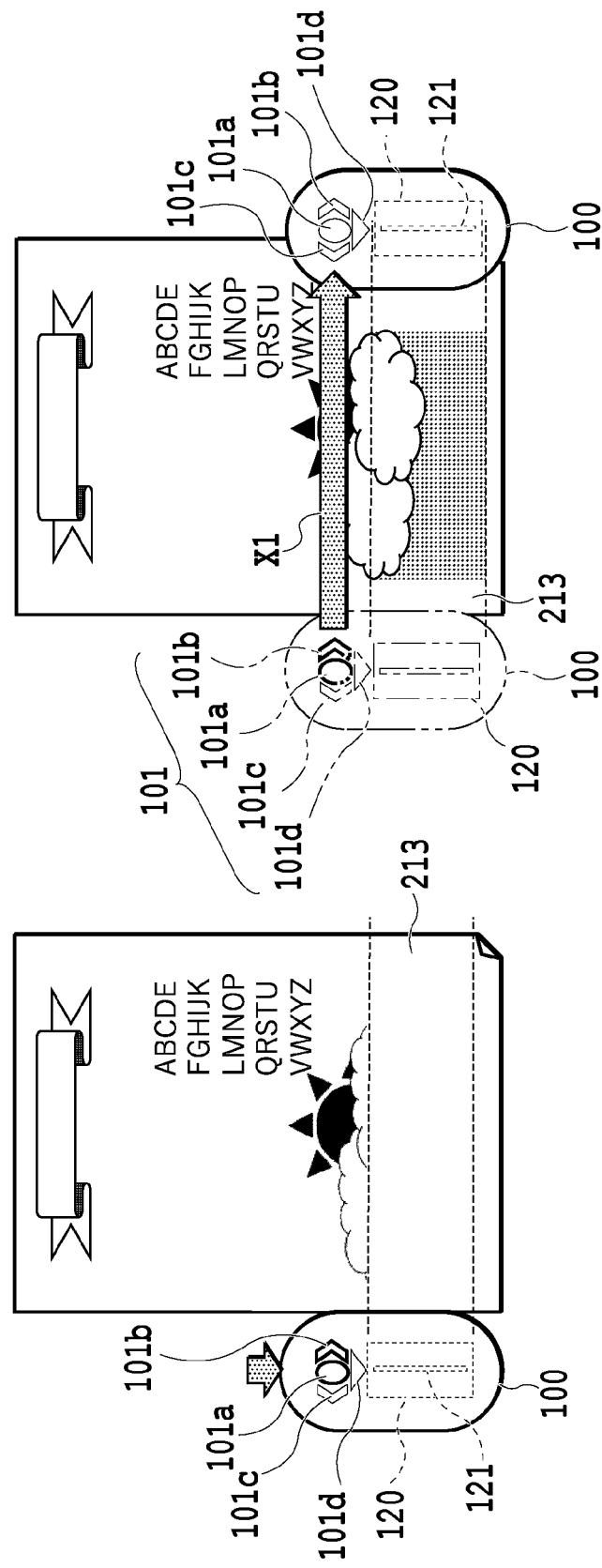

PRINTING SYSTEM, METHOD OF CONTROLLING PRINTING SYSTEM, AND STORAGE MEDIUM

BACKGROUND OF THE INVENTION

Field of the Invention

The present disclosure relates to a printing system, a method of controlling the printing system, and a storage medium and, specifically, relates to a printing system that performs printing with a user performing scanning manually.

Description of the Related Art

Today, there has been known a printing apparatus that performs printing on a printing medium with a user manually scanning a main body unit of the printing apparatus. The manual scanning type printing apparatus is called a handheld printing apparatus or the like. In a case of the handheld printing apparatus, it is up to the user to decide from which position on the printing medium to start printing. For this reason, the handheld printing apparatus has flexibility that it is possible to print an image in any position on the printing medium, but at the same time, it is difficult to perform printing accurately in a predetermined printing position on the printing medium. The handheld printing apparatus is provided with a head unit in a bottom portion facing the printing medium to perform the printing onto the printing medium. For this reason, it is difficult for the user to accurately align the position of the head unit and the printing start position of the printing medium, and this causes a reduction in the accuracy of printing an image.

Japanese Patent Laid-Open No. 2018-99825 discloses a technique of aligning the positions of a printing medium and a printing apparatus by providing a marker for the aligning in an end portion of a housing of the handheld printing apparatus to guide the user to an optimum printing start position.

SUMMARY OF THE INVENTION

The handheld printing apparatus disclosed in Japanese Patent Laid-Open No. 2018-99825 is intended for the user to form an image on the printing medium by one scanning. On the other hand, there has been desired improvement in the operability of a printing apparatus that prints an image by repeating scanning of and making a line break by the printing apparatus.

An object of the present disclosure is to improve the operability of a printing apparatus main body that prints an image while performing scanning and making a line break on a printing medium.

The present disclosure is a printing system, including: a printing apparatus main body that includes a printing unit that performs printing on a printing medium; a movement detection unit that detects scanning, which is movement of the printing apparatus main body in a first direction, and an operation of making a line break, which is movement in a second direction crossing the first direction; and a notification unit that selectively makes first notification that prompts scanning along with printing by the printing unit, second notification that prompts scanning along with no printing by the printing unit, and third notification that prompts the operation of making a line break, in accordance with a detection result of the printing unit.

According to the present disclosure, it is possible to improve the operability of a printing apparatus main body that prints an image while performing scanning and making a line break on a printing medium.

Further features of the present invention will become apparent from the following description of exemplary embodiments with reference to the attached drawings.

BRIEF DESCRIPTION OF THE DRAWINGS

FIGS. 1A to 1C are diagrams illustrating a positional relationship between a printing head and a printing medium provided in a printing apparatus;

FIGS. 2A to 2C are diagrams illustrating a positional relationship between the printing head and the printing medium provided in the printing apparatus;

FIGS. 12A and 12B are diagrams illustrating operations of scanning and making a line break in a fourth scanning range by the printing apparatus;

DESCRIPTION OF THE EMBODIMENTS

Figure 3B:
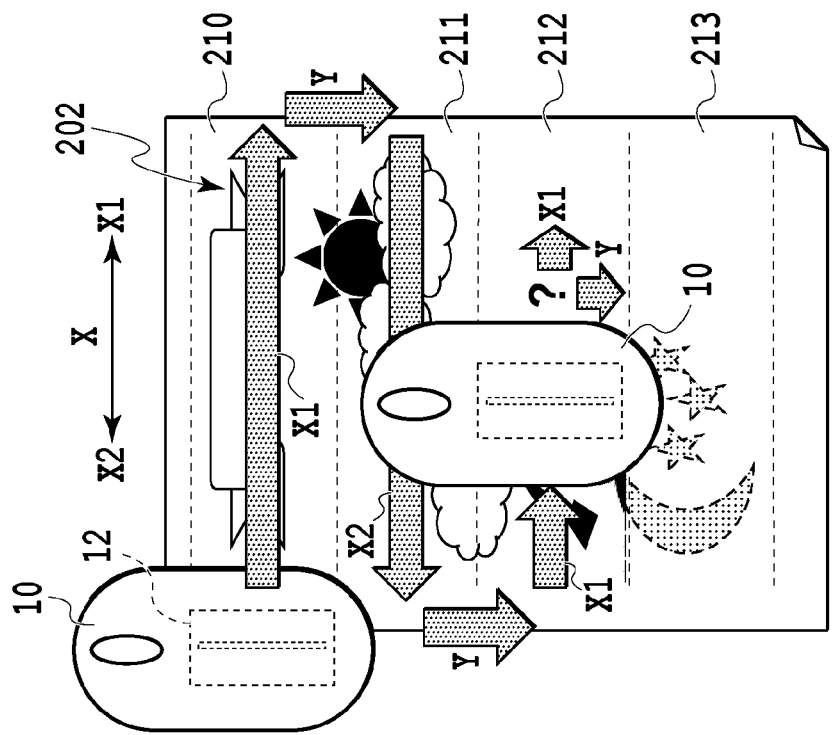
FIGS. 3A and 3B are diagrams illustrating scanning in a case of printing an image by a conventional handheld printing apparatus.

Next, an embodiment of the present disclosure is described in detail with reference to the drawings. The following embodiment is not intended to limit the present disclosure according to the scope of claims, and not all the combinations of the characteristics described in the present embodiment are necessarily required for the means for solving the problems of the present disclosure.

A handheld printing apparatus in the present embodiment performs printing on a printing medium with a user manually repeating scanning and making a line break by the handheld printing apparatus. In this case, a positional relationship between a printing head and the printing medium provided in the printing apparatus is as illustrated in FIGS. 1A to 1C and FIGS. 2A to 2C. In the drawings referred in the present specification, an X direction indicates a scanning direction of a printing head 120 (first direction), an X1 direction indicates a right direction (first scanning direction), X2 indicates a left direction opposite to X1 (second scanning direction), and Y direction indicates a direction of making a line break (second direction), respectively. The scanning direction (X direction) crosses (typically, being orthogonal to) the direction of making a line break (Y direction).

FIGS. 1A to 1C illustrate a state in which an image is printed by repeating scanning and making a line break by the printing head 120. In an example illustrated in FIG. 1A, scanning and making a line break by the printing head 120 is repeated so as to contain a rectangular region 201 (FIG. 1B) that is externally in contact with an image 202 to be printed. In each scanning, the printing head 120 ejects ink, and eventually an entire image (image of one page) as illustrated in FIG. 1C is printed. In the example illustrated in FIG. 1A, the printing is performed by scanning the printing head 120 over a range that is beyond two end portions of the printing medium. This scanning method is the simplest scanning method.

FIGS. 2A to 2C are diagrams illustrating an example of printing an image with a smaller amount of scanning by the printing head 120. In the present example, scanning ranges 210, 211, 212, and 213 of the printing head 120 for printing the image 202 are minimized, and a line break is made in a position in which each scanning ends. With this, it is possible to print an image with a smaller amount of scanning by the printing head 120.

In a stationary type printing apparatus that performs printing by conveying the printing medium without moving a printing apparatus main body, the scanning and the making of a line break by the printing head 120 as illustrated in FIGS. 1A to 1C and FIGS. 2A to 2C can be implemented relatively easily. However, in a conventional handheld printing apparatus, it has been difficult to manually perform the scanning and the making of a line break as illustrated in FIGS. 1A to 1C and FIGS. 2A to 2C. The reason is described below.

Figure 3A:
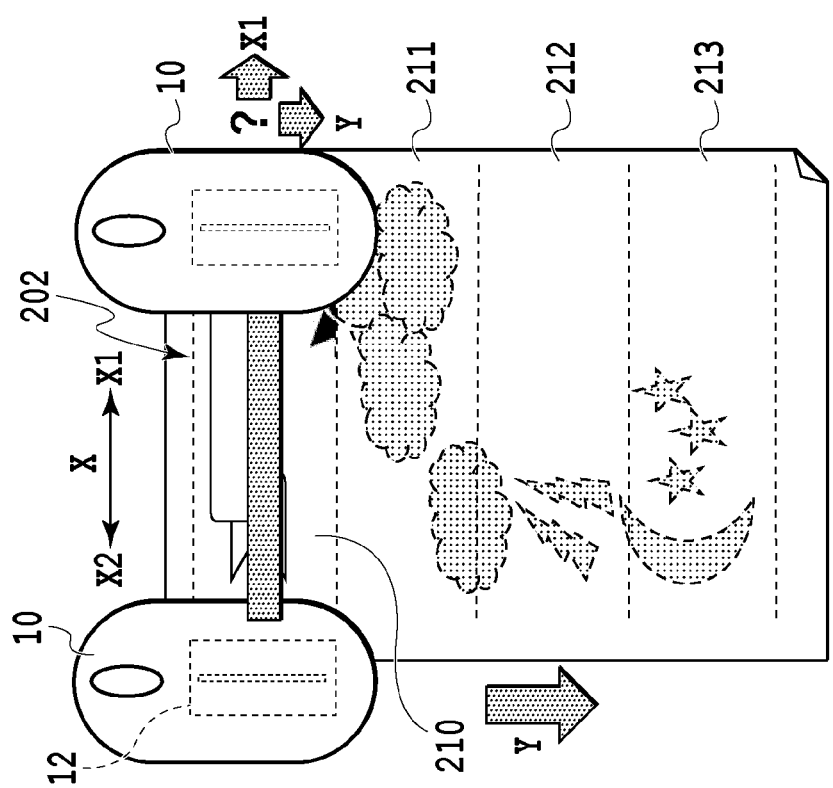

FIG. 3A illustrates an example in which an image same as that in FIG. 2C is printed by repeating the scanning and the making of a line break similar to that in FIG. 2A by using a conventional handheld printing apparatus 10. Here, the scanning range 210 that is printed by first scanning by the handheld printing apparatus 10 is referred to as a first scanning range. As illustrated in FIG. 3A, in a case of scanning over the first scanning range 210, the user cannot correctly determine whether the image formation of the first scanning range 210 is completed. This is because, as illustrated in FIGS. 3A and 3C, a printing head 12 is on in a bottom portion of a main body portion of the handheld printing apparatus 10 and the user cannot visually recognize the position of the printing head 12 and correctly determine how much the image has printed. Thus, the user cannot correctly determine whether to make a line break or to continue the scanning at a point at which the printing operation has progressed to some extent.

FIG. 3B is a diagram illustrating a state in which an image is printed in the third scanning range 212 that is printed by third scanning. As illustrated in FIG. 2B, the fourth scanning range 213 has a longer width than that of the third scanning range 212. For this reason, the user needs to make a line break after scanning the printing head 12 to a position that is sufficient to start the scanning in the fourth scanning range 213. However, as described above, since the user cannot visually recognize the position of the printing head 12, it is difficult to correctly determine the formation state of the image, and there is a possibility that line break may be made before reaching a position for making a line break. In this case, a desired image cannot be formed because an image that should be printed originally in the third scanning range 212 is printed in the fourth scanning range 213 and also the position of the image that should be printed in the fourth scanning range 213 is shifted.

As described above, in the handheld printing apparatus, the printing head is arranged in the bottom surface portion of the printing apparatus facing the printing medium; for this reason, the user cannot determine a position to make a line break by visually checking the printing head. Therefore, the conventional handheld printing apparatus 10 has a problem that the user cannot properly recognize the position to make a line break.

Figure 4C:
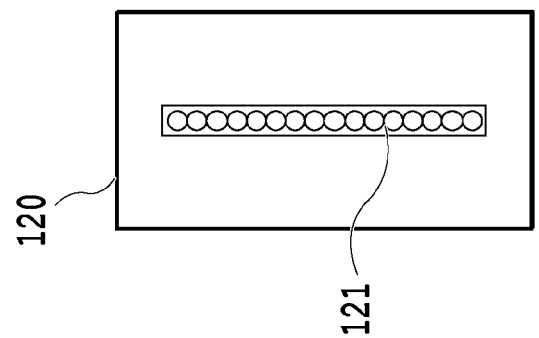
FIGS. 4A to 4C are diagrams illustrating a handheld printing apparatus in the present embodiment.
Figure 4B:
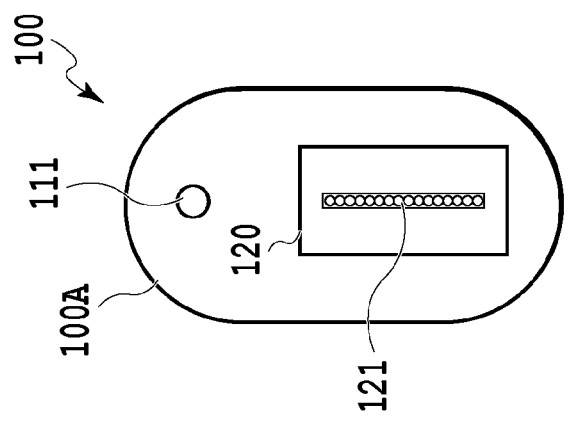
Figure 4A:
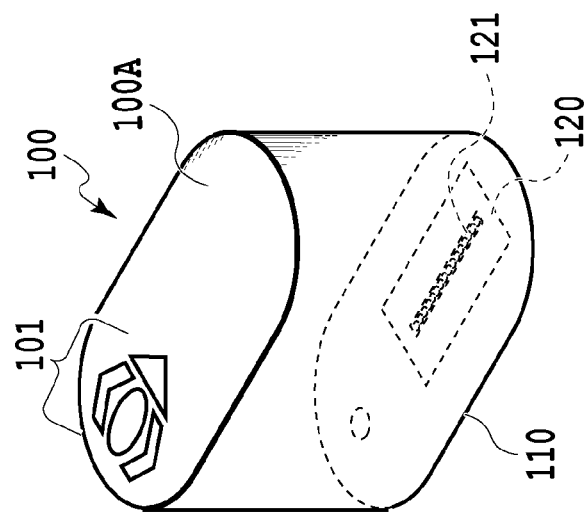

In contrast, the handheld printing apparatus in the present embodiment is capable of solving the above-described problem by employing the configuration described below. FIGS. 4A to 4C are diagrams illustrating the handheld printing apparatus (hereinafter, simply referred to as a printing apparatus) in the present embodiment, and FIG. 4A is an exterior perspective view, FIG. 4B is a bottom view, and FIG. 4C is a schematic enlarged view of the printing head.

A printing apparatus 100 in the present embodiment includes a printing apparatus main body 100A forming an outer shell (housing) of the printing apparatus 100 and a display unit 101 provided in a top surface portion of the printing apparatus main body 100A. The printing apparatus main body 100A is in a shape that the user can grip by one hand. In a bottom surface portion of the printing apparatus main body 100A that is a portion facing the printing medium, the printing head 120 as a printing unit and a head position sensor 111 that obtains positional information of the printing apparatus main body 100A (corresponding to positional information of the printing head 120). The printing apparatus main body 100A stores various driving units such as the printing head 120 and the display unit 101 and a control unit that controls the driving unit, and the like. As described later, the head position sensor 111 obtains positional information in the scanning direction (X direction) and positional information in the direction of making a line break (Y direction) of the printing head 120 and is used as a movement detection unit.

The printing apparatus in the present embodiment is an ink-jet printing type printing apparatus that performs printing by ejecting ink from the printing head 120. The printing head 120 is provided with an ejection port array 121 in which multiple ejection ports ejecting the ink are arrayed. In FIGS. 4A to 4C, for the sake of simple descriptions, only one ejection port array 121 ejecting ink of a predetermined color is illustrated in the printing head 120; however, in reality, the number of the provided ejection port arrays 121 usually corresponds to the number of colors used for printing. In the printing apparatus 100 in the present embodiment, a printing head employing the ink-jet printing method is exemplified as the printing unit; however, a printing head employing another printing method may be provided as the printing unit. For example, it is also possible to employ a thermal transfer type printing unit or an ink ribbon type printing unit.

The display unit 101 serves as a notification unit that visually notifies of a state of the printing apparatus 100. With the display state of the display unit 101 being visually recognizable, the user is able to grasp the current state of the printing apparatus. The contents displayed on the display unit 101 are described in detail later with reference to FIG. 6 and the like.

Figure 5:
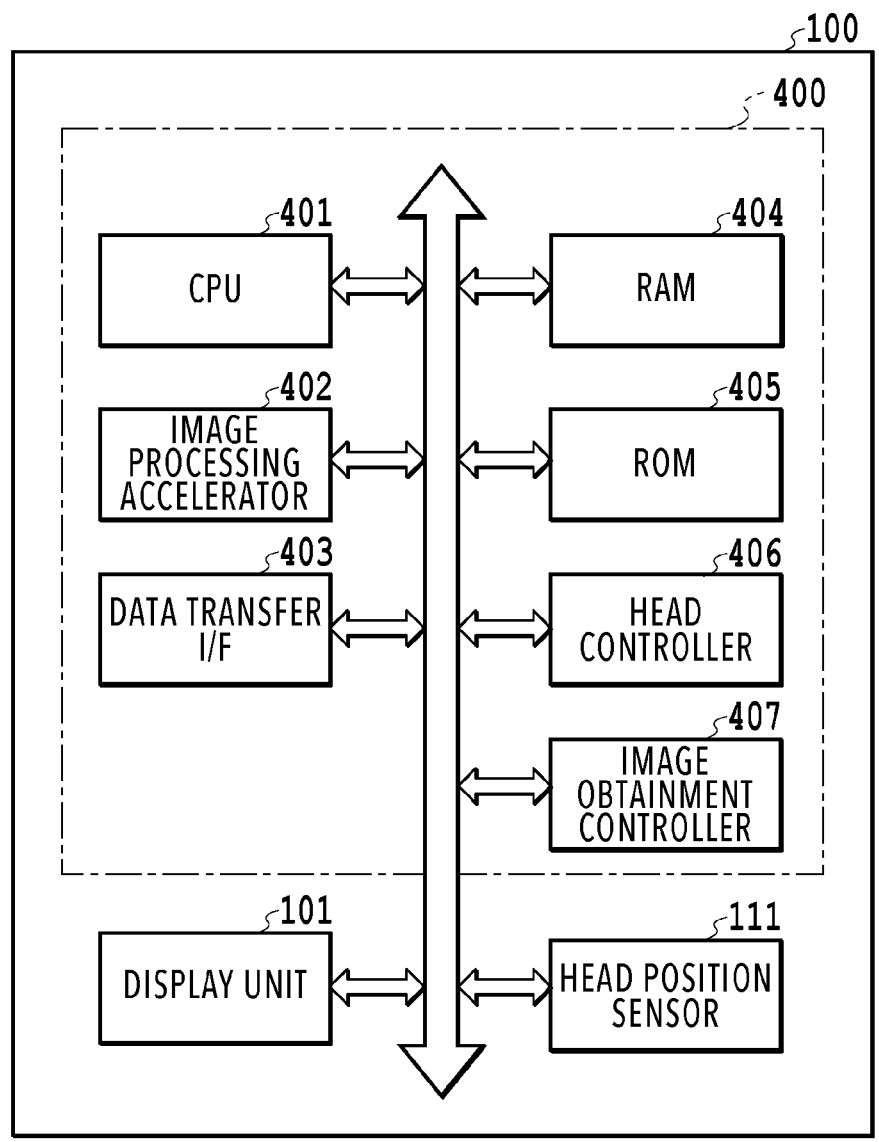
FIG. 5 is a block diagram illustrating a schematic configuration of a control unit that controls the printing apparatus.

FIG. 5 is a block diagram illustrating a schematic configuration of a control unit 400 that controls the printing apparatus 100. The control unit 400 includes a CPU 401, a ROM 405, a RAM 404, an image processing accelerator 402, a data transfer I/F 403, an image obtainment controller 407, and the like. The CPU 401 is connected with the display unit 101, the head position sensor 111, and the like described above. The CPU 401 serves as a control unit that controls each unit in accordance with a program stored in the ROM 405 and executes processing described later in FIGS. 8, 9A, and 9B. For the processing executed by the CPU 401, the RAM 404 serves as a working area for temporarily storing data and also stores image data of one scanning and the like.

The image processing accelerator 402 performs predetermined image processing with the CPU 401 on printing data, which is transferred from a not-illustrated host apparatus through the data transfer I/F 403 by the image obtainment controller 407, and divides the printing data into image data of one scanning. The divided image data is stored into the RAM 404. The data stored in the RAM 404 includes information on the left end and the right end in each scanning range. In the present embodiment, there is illustrated an example in which the image processing is performed by the printing apparatus 100; however, a result processed by a personal computer (PC), a smartphone, or the like as the host apparatus may be received as input data together with predetermined printing setting.

The head position sensor 111 is a sensor that detects the position of the printing head 120 in the X direction and the Y direction. In a case where the printing apparatus 100 is in a movement state during the scanning and the making of a line break by the printing apparatus 100, a movement direction, a movement distance (movement amount), and the like of the printing head 120 are detected, and positional information in the scanning direction (X direction) and positional information in the direction of making a line break (Y direction) of the printing head 120 are sequentially obtained. Based on the positional information of the printing head 120 obtained by the head position sensor 111, a head controller 406 controls an ink ejection operation of the printing head 120 based on the printing data of one scanning stored in the RAM 404. The head position sensor 111 used in the present embodiment is a general optical tracking sensor that is used in a mouse and the like. In other words, the head position sensor 111 obtains the positional information of the printing head 120 by irradiating a surface of a target medium with light emitted from a light source such as an LED and a laser to capture an image and observe the surface state of the irradiated portion with an image pickup device every short period of time. As long as the movement amount of the printing head can be measured, an inertial sensor such as an acceleration sensor and a gyroscope sensor may be used. It is also possible to perform the printing with a device for measuring the movement amount being additionally provided outside the printing apparatus 100 to transmit the movement amount of the printing apparatus 100 to the printing apparatus 100 real-time. In this case, it is unnecessary to provide the head position sensor in the printing apparatus 100.

Based on the positional information obtained from the head position sensor 111, the CPU 401 determines a later-described state related to the execution of the scanning and the making of a line break by the printing apparatus 100 and drives the display unit 101 provided in the printing apparatus main body 100A based on the determined result.

Figure 6:
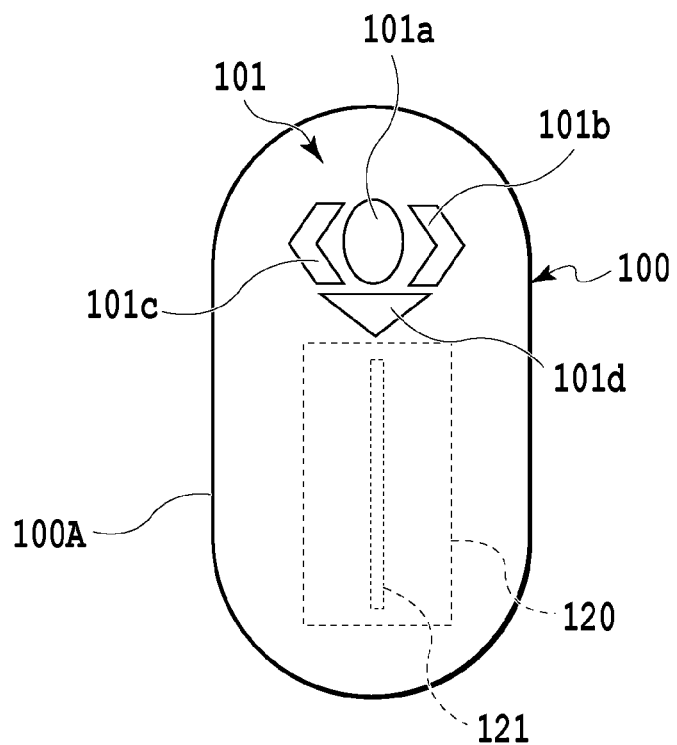
FIG. 6 is a plan view illustrating a configuration of a display unit.

FIG. 6 is a plan view illustrating a configuration of the display unit 101. The display unit 101 includes four elements, which are a first display unit 101a, a second display unit 101b, a third display unit 101c, and a fourth display unit 101d. The first display unit 101a to the fourth display unit 101d selectively make notification of a first state (first notification), notification of a second state (second notification), and notification of a third state (third notification), which are described later, by combination of lighting-up and lighting-out of the first display unit 101a to the fourth display unit 101d.

The lighting-up of the first display unit 101a indicates a state in which the printing is executed once the printing apparatus 100 is slid, and the lighting-out of the first display unit 101a indicates a state in which the printing is not executed even if the printing apparatus 100 is slid.

The second display unit 101b is a display unit in an arrow shape pointing in the right direction (X1 direction), and the second display unit 101b is lighted up in a case where the scanning of the printing apparatus 100 in the right direction is suggested and is lighted out in a case where the scanning in the right direction is not suggested.

The third display unit 101c is a display unit in an arrow shape pointing in the left direction (X2 direction), and the third display unit 101c is lighted up in a case where the scanning of the printing apparatus main body 100A in the left direction X2 is suggested and is lighted out in a case where the scanning in the left direction X2 is not suggested.

The fourth display unit 101d is a display unit in an arrow shape pointing in the direction Y of making a line break, and the fourth display unit 101d is lighted up in a case where the whole data that should be printed in the current scanning range has printed and the printing apparatus 100 is in a state of waiting for the making of a line break.

Here are described the first state to the third state. The first state is a state in which the printing is executed by the printing head 120 once the printing apparatus 100 is slid in the right direction X1 or the left direction X2. In the first state, the first display unit 101a is lighted up, and also either one of the second display unit 101b and the third display unit 101c is lighted up. The lighting-up second display unit 101b or third display unit 101c represents that there is the printing data in the current scanning range. That is, the second display unit 101b or the third display unit 101c is in display suggesting the scanning in the direction indicated by the lighting-up display unit. In the first state, the fourth display unit 101d is lighted out.

The second state is a state in which mainly the printing head is positioned inside the left and right ends of the printing data. In the state, unless the printing head 120 is moved to the outside the left and right ends of the current scanning range, the printing head 120 does not perform the printing operation. For example, the second state is a case where the printing apparatus 100 is positioned in the next scanning range as a result of making a line break. In the second state, the first display unit 101a is lighted out, and either one of the second display unit 101b and the third display unit 101c is lighted up. In other words, the second display unit 101b or the third display unit 101c that instructs an image end portion in a position closer to the current position of the printing apparatus 100 is lighted up. For example, in a case where the right end of the image expressed by the printing data is closer to the current printing apparatus 100 than the left end portion is, the second display unit 101b is lighted up, and in a case where the left end of the image is closer than the right end is, the third display unit 101c is lighted up. In the second state, the fourth display unit 101d is lighted out.

The third state is a state in which the printing of the current scanning range is completed and waiting for the making of a line break. In the third state, it is possible to scan the printing apparatus 100 in the right direction (X1 direction) and the left direction (X2 direction) before a line break is made. However, the printing operation is not performed until a line break is made, and the third state is continued. In the third state, the first display unit 101a is lighted out, and the other display units (the second display unit 101b, the third display unit 101c, and the fourth display unit 101d) are lighted up.

In the present embodiment, the display unit 101 includes the four elements, which are the first display unit 101a to the fourth display unit 101d. However, as long as it is possible to distinguish the first state to the third state, another form of notification may be applied. For example, it is also possible to perform state display by changing the color of an LED, state display using a liquid crystal display, notification of a state by sound from a sound output unit, notification by vibration, and the like. It is also possible to employ a mode in which no display unit is mounted in the printing apparatus main body 100A and the first state to the third state are transmitted to an external apparatus such as a smartphone or a personal computer to notify of the state by the external apparatus. That is, the present embodiment may be executed by a system including the printing apparatus main body 100A and an external apparatus including a display unit for notification of the first state to the third state. In the present disclosure, either of the configuration in which the printing apparatus 100 includes the display unit for notification and the configuration in which an external apparatus different from the printing apparatus 100 includes the display unit for notification may be applied; for this reason, both the configurations are referred to as a printing system. As an example of the printing system, the configuration in which the printing apparatus 100 includes the display unit for notification is described below for example.

Figure 7:
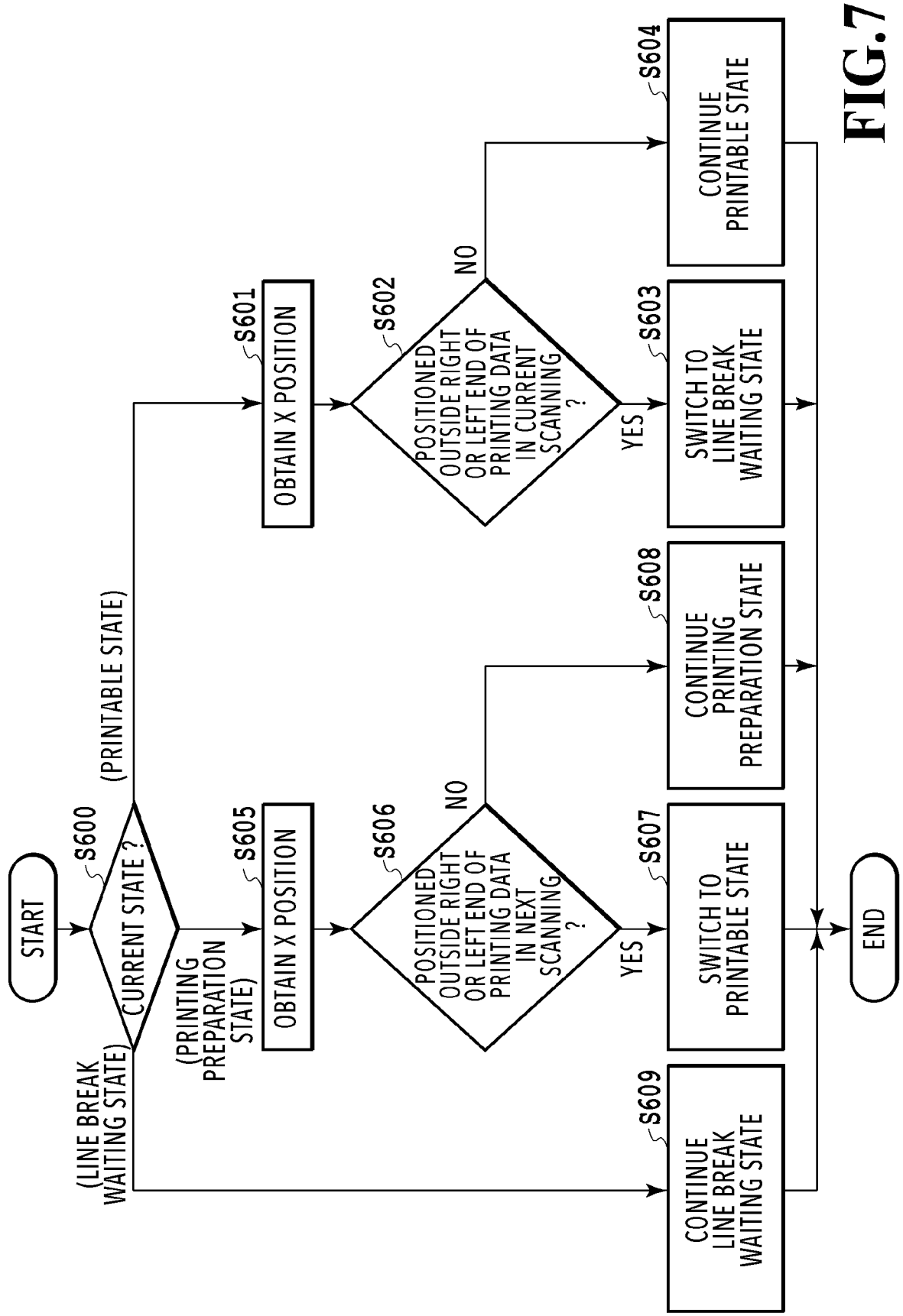
FIG. 7 is a flowchart illustrating processing of setting a state of the printing apparatus.

FIG. 7 is a flowchart illustrating processing by the printing apparatus 100 to set the state (the first state, the second state, and the third state) of the printing apparatus 100 based on the positional information in the X direction from the head position sensor 111. The processing illustrated in FIG. 7 is executed by the CPU 401. In the flowcharts in FIGS. 7 and 8 referred in the following descriptions, S marked on each processing number means a step.

The CPU 401 obtains the current positional information of the printing head 120 in the scanning direction (X direction) based on the positional information received from the head position sensor 111. Then, based on the current positional information, in S600, the CPU 401 determines whether the current state of the printing apparatus 100 is the first state, the second state, or the third state. If it is determined that the current state of the printing apparatus 100 is the first state (printable state), in S601, the CPU 401 obtains the current position (X position) of the printing head 120 in the scanning direction (X direction) based on the positional information from the head position sensor 111. Thereafter, in S602, the CPU 401 determines whether the printing head 120 is positioned outside the left end or the right end of the image that should be formed in the current scanning range. If it is determined that the printing head 120 is positioned outside the end portion of the image, the whole printing data in the current scanning range has printed; accordingly, the CPU 401 switches the state of the current printing apparatus 100 from the first state to the third state (line break waiting state) (S603).

In S602, if it is determined that the printing apparatus 100 is not positioned outside the end portion of the image, in S604, the CPU 401 repeats the processing of S600 to S602 while continuing the first state (printable state). Once the printing head 120 is positioned outside the image that should be formed in the current scanning range, the CPU 401 switches the current state of the printing apparatus 100 from the first state (printable state) to the third state (line break waiting state) (S603).

In S600, if it is determined that the current state of the printing apparatus 100 is in the second state (printing preparation state), in S605, the CPU 401 obtains the current X position of the printing head 120. Additionally, the CPU 401 determines whether the printing head 120 is positioned outside the image that should be formed in the current scanning range. If it is determined that the printing head 120 is positioned outside the image, the CPU 401 switches the state of the current printing apparatus 100 from the second state to the first state (printable state) (S607).

In S600, if the CPU 401 determines that the current state of the printing apparatus 100 is in the third state (line break waiting state), the position of the printing apparatus 100 is not changed until a line break is made. Accordingly, even if the X position of the printing apparatus 100 is updated in any way, the third state (line break waiting state) is continued (S609).

Figure 8:
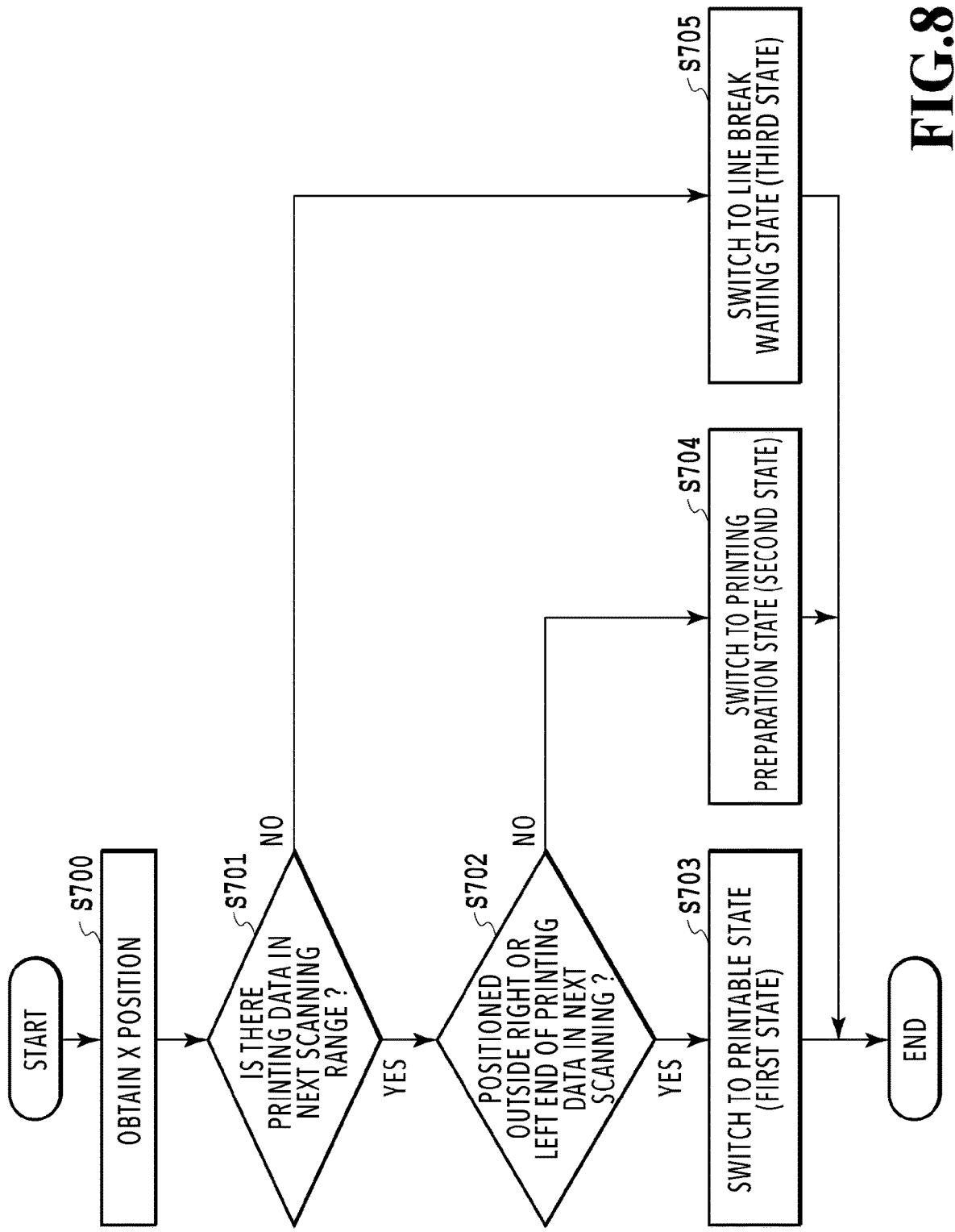
FIG. 8 is a flowchart illustrating processing of setting a state of the printing apparatus in a case where an operation of making a line break is performed.

FIG. 8 is a flowchart illustrating processing to set the state (the first state, the second state, and the third state) of the printing apparatus 100 in a case where the printing apparatus 100 is moved from the scanning range in the direction of making a line break (second direction (Y direction)). The processing illustrated in FIG. 8 is executed by the CPU 401.

Once the printing apparatus 100 is moved by the user in the direction of making a line break (Y direction) and the positional information indicating a change in the position in the Y direction is received from the head position sensor 111, in S700, the CPU 401 obtains the current position of the printing head 120 in the X direction. Thereafter, in S701, the CPU 401 determines whether there is the printing data of the image that should be printed in the scanning range after a line break is made. In this process, if it is determined that there is no printing data of the image that should be printed in the scanning range after a line break is made, the CPU 401 continues the third state (line break waiting state) in S705 to wait for a line break to be made additionally.

On the other hand, in S701, if it is determined that there is the printing data of the image that should be printed in the scanning range after a line break is made, the CPU 401 determines whether the X position of the printing head 120 is outside the left end or the right end of the printing data (S702). If the X position of the printing head 120 is outside the left end or the right end of the printing data, it is possible to start the printing in the scanning range after a line break is made; for this reason, in S703, the CPU 401 switches the state of the printing apparatus 100 from the third state to the first state. If the X position of the printing head 120 is inside the left end or the right end of the printing data, the printing head 120 once needs to be moved to the outside the left end or the right end of the image. For this reason, if the determination result in S702 is NO, in S704, the CPU 401 switches the printing apparatus 100 to the second state.

Figure 9B:
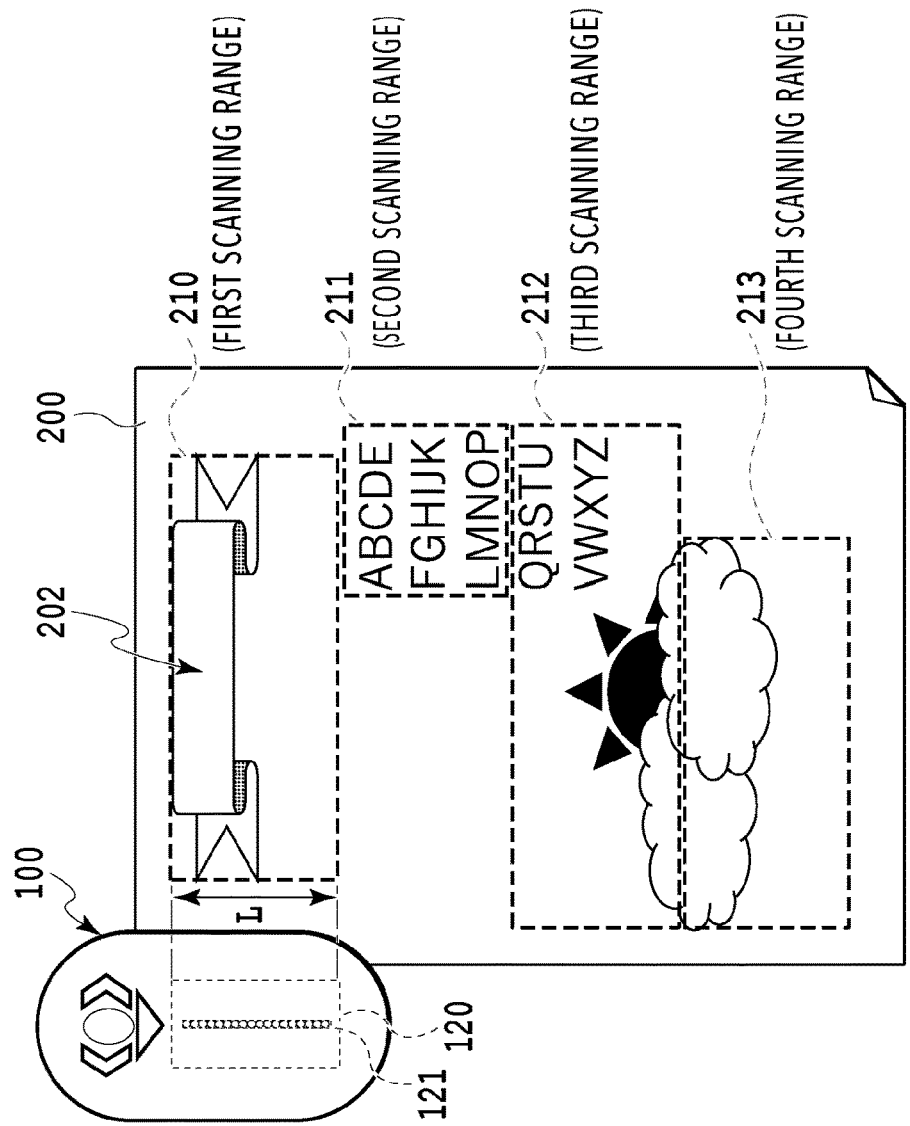
FIGS. 9A and 9B are diagrams illustrating a scanning range in the printing apparatus of the present embodiment.
Figure 9A:
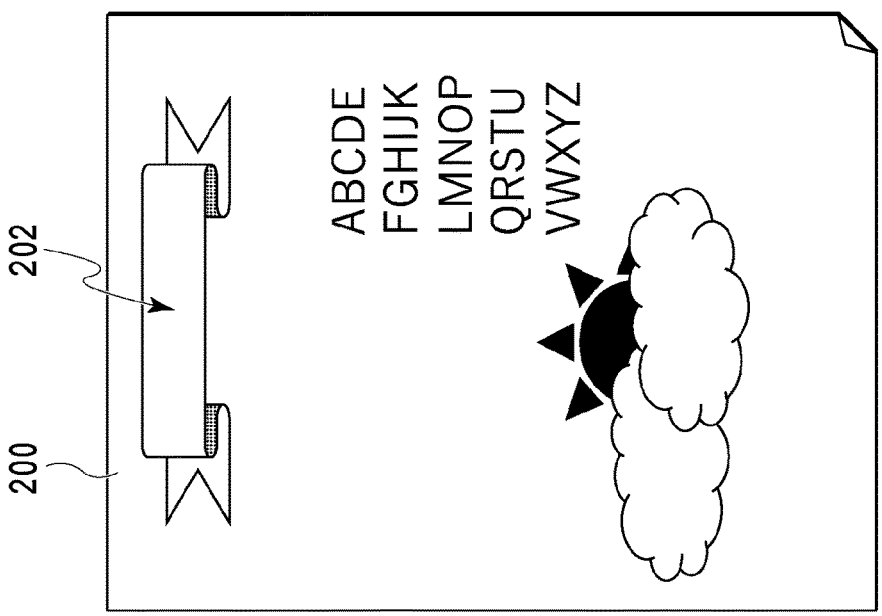

FIGS. 9A and 9B are diagrams illustrating multiple scanning ranges in a case where an image is printed by scanning the printing apparatus 100 of the present embodiment multiple times. The image 202 printed on a printing medium 200 is divided into multiple scanning ranges in accordance with a length L of the ejection port array 121 of the printing head 120 of the printing apparatus 100 to be printed. In an example illustrated in FIG. 9, there is illustrated an example in which the image that should be printed is divided into the first to the fourth scanning ranges 210 to 213. Each scanning range has a rectangular shape as indicated by a broken line in FIG. 9, and a length of the printing apparatus 100 in the direction of making a line break (Y direction) orthogonal to the scanning direction (X direction) is the same as the length of the ejection port array 121 of the printing head 120. In a case where an ejection port near an end portion within the ejection port array 121 is not used, the length of each scanning range in the Y direction is determined based on the length not including the ejection port.

In a case where the printing apparatus 100 starts the printing operation, the printing data of the image that should be printed in each of the first to the fourth scanning ranges 210 to 213 and the positional information of the left and right ends of each printing data are stored into the RAM 404. Based on the stored printing data and positional information of the left and right ends, the printing head 120 starts printing the image sequentially in each scanning range. The process of printing the image using the printing apparatus 100 that is exemplified in FIG. 9 is described below with reference to FIGS. 10A to 12B.

FIGS. 10A to 10D are diagrams illustrating the process from printing the image in the first scanning range 210 by one scanning by the printing apparatus 100 to making a line break. FIGS. 11A to 11D are diagrams illustrating the process of printing the image in the second scanning range 211 by second scanning by the printing apparatus 100, making a line break, and thereafter forming the third scanning range 212. FIGS. 12A and 12B are diagrams illustrating the process from the state illustrated in FIG. 11D to making a line break and then printing in the fourth scanning range 213.

Figure 10A:
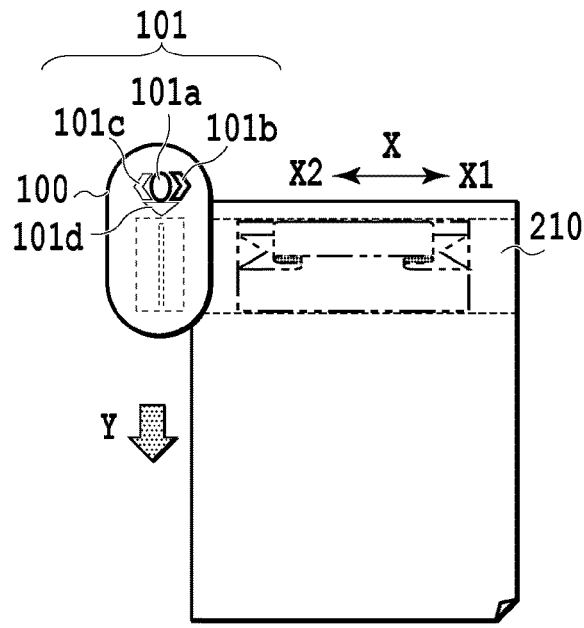
FIGS. 10A to 10D are diagrams illustrating operations of scanning and making a line break in a first scanning range by the printing apparatus.

FIG. 10A illustrates a state before the printing is started. In this state, the printing apparatus 100 is positioned outside the end portion of the first scanning range 210 and there is the image data of the image that should be printed in the first scanning range 210. Thus, the printing apparatus 100 is in the first state in which the printing apparatus 100 is able to perform the printing by scanning. In the example in FIG. 10A, since the printing apparatus 100 is positioned outside the left end of the first scanning range 210; accordingly, in the display unit 101, the first display unit 101a and the second display unit 101b prompting the scanning rightward are lighted up. The user starts the scanning in the right direction (X1 direction) in accordance with the lighting-up first display unit 101a and second display unit 101b.

Figure 10B:
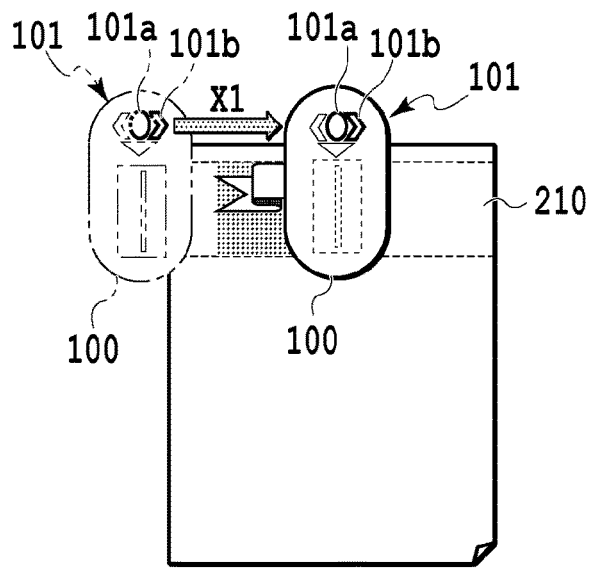

Once the printing apparatus 100 in the first state is slid in the right direction (first direction), the ink is ejected from the ejection port array 121 of the printing head 120 in accordance with the printing data, and as illustrated in FIG. 10B, the image is printed in the first scanning range 210. With the printing apparatus 100 being slid in the right direction, the X position of the printing head 120 is sequentially updated based on the positional information from the head position sensor 111. Then, until the printing head 120 passes through the right end of the first scanning range 210, the first state is maintained as illustrated in S604 in FIG. 7, and the lighting-up state of the first display unit 101a and the second display unit 101b is maintained.

Figure 10C:
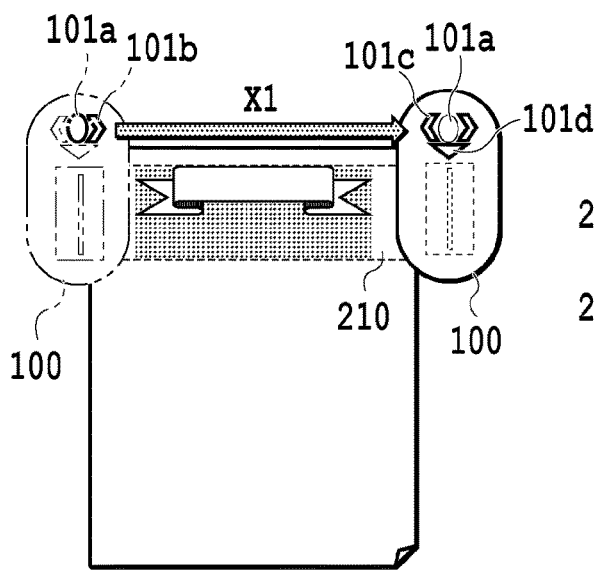
Figure 10D:
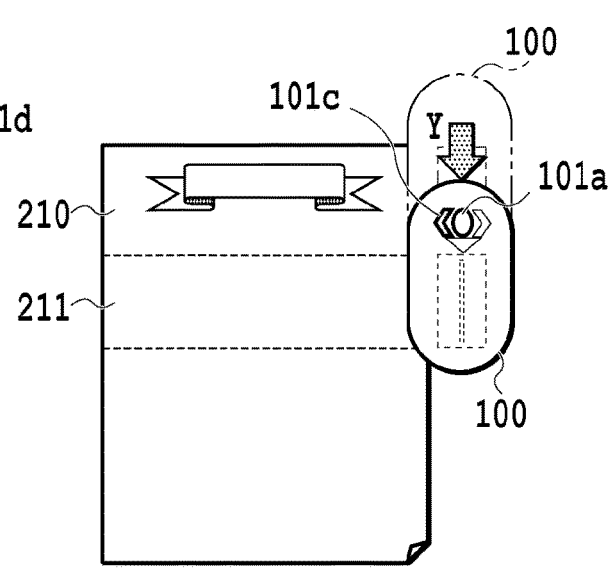

Subsequently, as illustrated in FIG. 10C, once the printing of the image into the first scanning range 210 is completed, as indicated in S603 in FIG. 7, the state of the printing apparatus 100 is switched to the third state. The third state is a line break waiting state in which no printing is executed even if the printing apparatus 100 is moved to the right and left and waiting for the operation of making a line break. Simultaneously with the switching to the third state, in the display unit 101, the first display unit 101a is lighted out, and the second display unit 101b, the third display unit 101c, and the fourth display unit 101d are lighted up. With the lighting-up of the second to the fourth display units 101b to 101d in the display unit 101, the user recognizes that the printing of the image that should be printed in the first scanning range 210 by the printing apparatus 100 is completed and it is in the line break waiting state (third state).

Next, the user makes a line break by moving the printing apparatus 100 in the Y direction (third direction). Along with the movement of the printing apparatus 100 in the Y direction while making a line break, the Y position of the printing head 120 is sequentially updated based on the positional information from the head position sensor 111. Once the printing head 120 of the printing apparatus 100 is moved to the line break position outside the right end of the second scanning range 211, the printing apparatus 100 is switched to the printable state (first state) in accordance with the flowchart in FIG. 8. Simultaneously with the switching of the printing apparatus 100 to the first state, the second display unit 101b and fourth display unit 101d, which were lighted up until then, are lighted out, and on the other hand, the first display unit 101a is newly lighted up while the third display unit 101c maintains the lighting-up state. With such a change in the lighting-up state of the display unit 101, the user recognizes that the printing apparatus 100 reaches the line break position and it is in a state in which the printing into the second scanning range 211 is possible (first state).

Figure 11A:
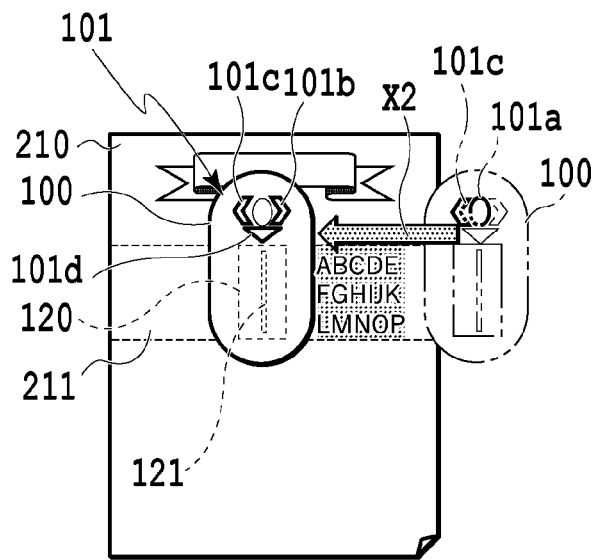
FIGS. 11A to 11D are diagrams illustrating operations of scanning and making a line break in second and third scanning ranges by the printing apparatus.

Thereafter, in accordance with the display of the display unit 101, the user prints the image into the second scanning range 211 by moving the printing apparatus 100 in the left direction (X2 direction) as illustrated in FIG. 11A. Along with the movement in the left direction, the X position of the printing head 120 is sequentially updated based on the positional information from the head position sensor 111. Once the printing of the image in the second scanning range 211 by the printing head 120 is completed, the printing apparatus 100 is switched to the line break waiting state (third state), and in the display unit 101, the first display unit 101a is lighted out, and the second to the fourth display units 101b to 101d are lighted up. FIG. 11A illustrates a state in which the printing of the image is completed in a middle position in the second scanning range 211.

Figure 11B:
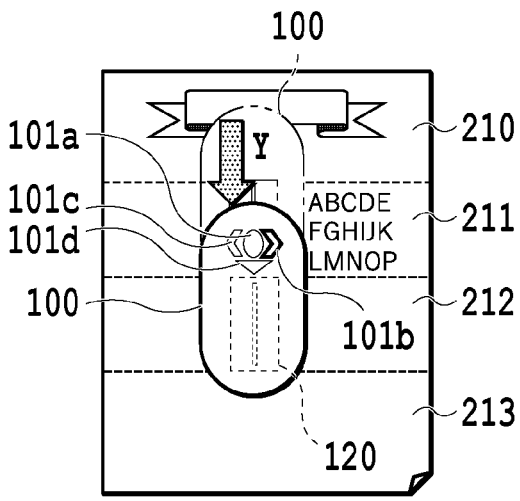

Subsequently, in accordance with the display of the display unit 101, the user moves the printing apparatus 100 in the Y direction to make a line break to enter the third scanning range as illustrated in FIG. 11B. Once the printing apparatus 100 is moved to the line break position, the printing apparatus 100 is switched to the printing preparation state (second state) based on the positional information from the head position sensor 111. In other words, in the example illustrated in FIG. 11B, the position of the printing head 120 after a line break is made is positioned inside the left and right ends of the third scanning range 212. Thus, in accordance with the flowchart in FIG. 8, the printing apparatus 100 is switched to the printing preparation state (second state). The printing preparation state is a state in which no printing is performed even if the printing apparatus 100 is slid.

Simultaneously with the switching of the printing apparatus 100 to the printing preparation state, the display unit 101 is switched from the display indicating the line break waiting state illustrated in FIG. 11A to the display illustrated in FIG. 11B. Specifically, it is a state in which, out of the second to the fourth display units 101b to 101d that are lighted up in the line break waiting state illustrated in FIG. 11A, the third display unit 101c and the fourth display unit 101d are lighted out, and only the second display unit 101b is lighted up. Accordingly, the user is able to complete the making a line break easily and properly by moving the printing apparatus 100 in the Y direction until the display of the display unit 101 is switched.

In the example illustrated in FIG. 11B, the distance in the X direction from the left end of the second scanning range 211 to the printing head 120 is shorter than the distance in the X direction from the right end of the second scanning range 211 to the printing head 120. For this reason, with the first display unit 101a being lighted up, the user is guided to perform the scanning toward the right end in the second scanning range. However, in the printing preparation state, the user is not necessarily follow the display of the display unit 101. The printing apparatus 100 may be moved toward the left end of the third scanning range 212. Regardless of whether the printing apparatus 100 is moved toward either of the left end and the right end, the position of the printing head 120 is updated based on the positional information from the head position sensor 111, and the state of the printing apparatus 100 is switched in accordance with the flowchart in FIG. 8 based on the updated position.

Figure 11C:
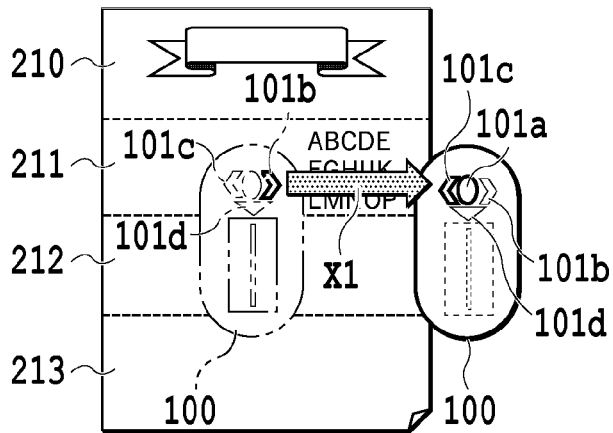

Next, the user moves the printing apparatus 100 toward the right end or the left end of the third scanning range 212. FIG. 11C illustrates a state in which the printing apparatus 100 is slid toward the right end of the third scanning range 212 in accordance with guiding by the display unit 101. Once the printing head 120 of the printing apparatus 100 goes beyond the right end of the third scanning range 212 by the scanning, the display unit 101 switches the printing apparatus 100 to the printable state (first state) in accordance with the flowchart in FIG. 8. Simultaneously with the switching of the printing apparatus 100 to the first state, in the display unit 101, the second display unit 101b is lighted out and the first display unit 101a and the third display unit 101c are lighted up so as to guide the user to perform the scanning in the left direction.

Figure 11D:
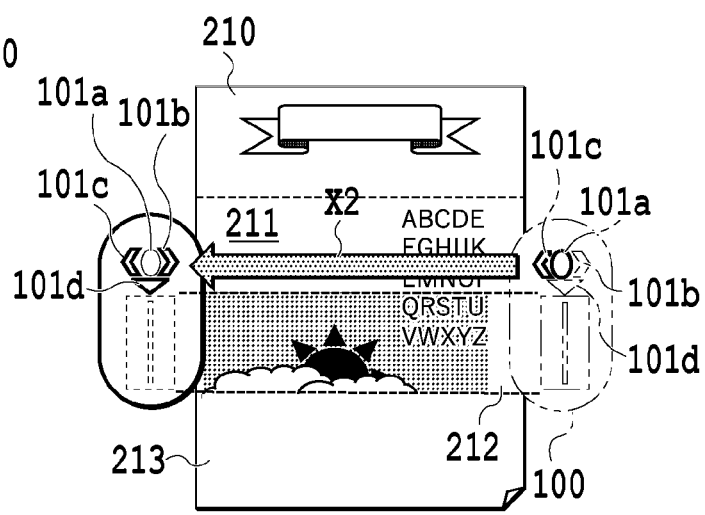

In this process, in accordance with the display of the display unit 101, the user scans the printing apparatus 100 in the left direction (X2 direction) as illustrated in FIG. 11D. That is, the printing apparatus 100 is slid from the right end toward the left end of the third scanning range 212. In this process, since the printing apparatus 100 is in the first state, the printing apparatus 100 prints the image in the third scanning range 212. Once the printing apparatus 100 goes beyond the left end of the third scanning range 212, the printing apparatus 100 is switched to the line break waiting state (third state) in accordance with the flowchart in FIG. 8. In this process, in the display unit 101, the first display unit 101a, which is lighted up in the first state, is lighted out, and the second to the fourth display units 101b to 101d are lighted up. With the display, the user recognizes that the printing of the image is completed with the printing head 120 going beyond the end portion of the third scanning range 212 and it is switched to the line break waiting state.

Thereafter, the user makes a line break by moving the printing apparatus 100 in the Y direction. Also in the operation of making a line break, the user may move the printing apparatus 100 in the Y direction until the display of the display unit 101 is switched from the state in FIG. 11D to the position illustrated in FIG. 12A. That is, the printing apparatus 100 may be moved in the Y direction until reaching a state in which, out of the second to the fourth display units 101b to 101d that are lighted up in the line break waiting state in FIG. 11D, the third and the fourth display units 101c and 101d are lighted out and the first and the second display units 101a and 101b are lighted up. In the operation of making a line break, the printing head 120 is positioned outside the end portion of the fourth scanning range 213. In the fourth scanning range 213, there is the printing data of the image that should be printed. Thus, in accordance with the flowchart in FIG. 8, the state of the printing apparatus 100 is switched to the first state (printable state).

In this process, in accordance with the guiding by the second display unit 101b, the user scans the printing apparatus 100 in the right direction. With the scanning, the image is printed in the fourth scanning range 213 as illustrated in FIG. 12B. As described above, the printing on the printing medium 200 is all completed. Once the printing is completed, as illustrated in FIG. 12B, the first to the fourth display units 101a to 101d in the display unit 101 are all lighted out; accordingly, the user can visually recognize the completion of the printing. That is, in the display unit 101, in addition to the above-described first to third notification, fourth notification representing that the printing is all completed is made.

In the above descriptions, an example in which there is the printing data of the image that should be printed in each of the scanning ranges 210 to 213 is described as an example. However, as illustrated in FIGS. 13A to 13D, the multiple scanning ranges may include a scanning range in which there is no image that should be printed. In a case of forming such an image, with the conventional printing apparatus that has no control function nor display unit of the present embodiment, the user is forced to determine whether to perform scanning or making a line break in the second scanning range 211 after the printing and the making of a line break in the first scanning range 210.

Figure 13A:
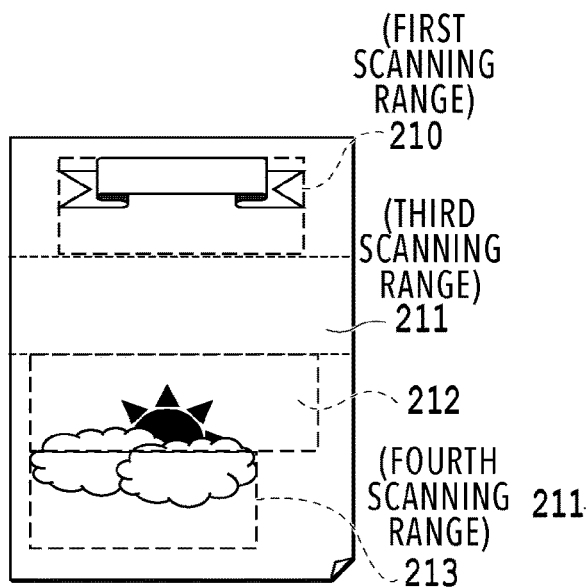
FIGS. 13A to 13D are diagrams illustrating a case where there is no image that should be printed in a scanning range.
Figure 13B:
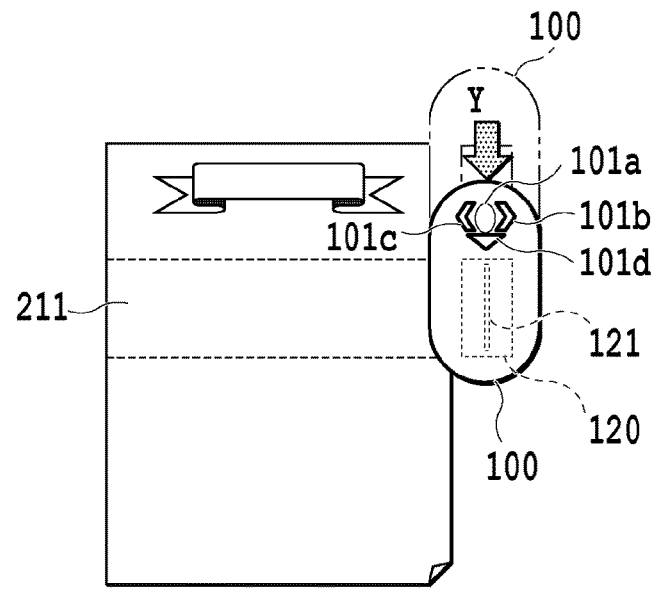
Figure 13C:
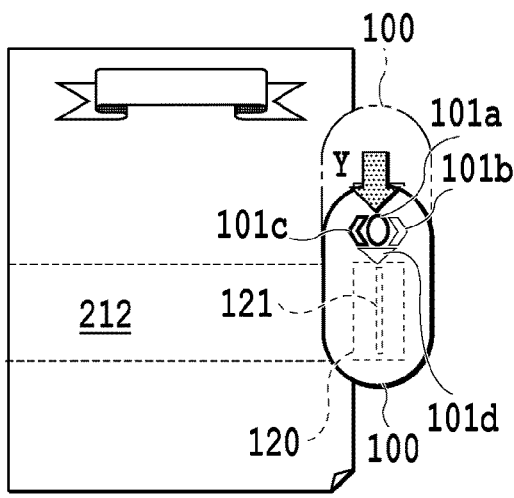
Figure 13D:
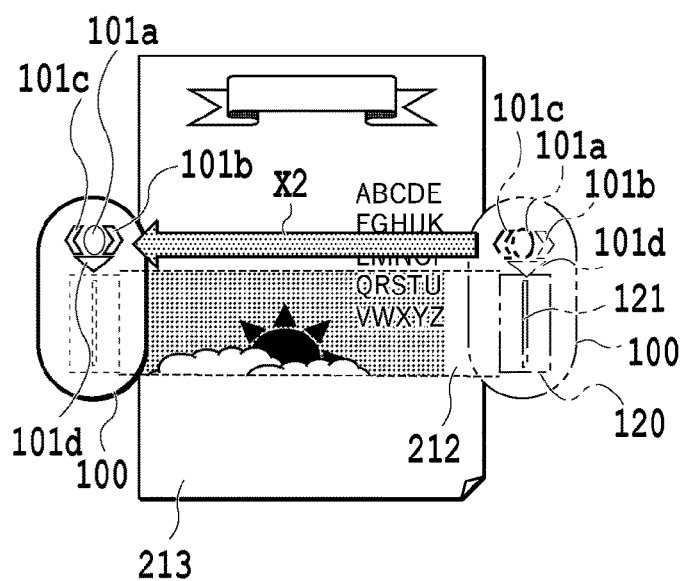

In contrast, in the present embodiment, it is possible to progress the printing operation with no hesitation in accordance with the display of the display unit 101 even for the image as illustrated in FIGS. 13A to 13D. First, the user performs the printing by the scanning in the first scanning range as with FIG. 10A and thereafter makes a line break in accordance with the display of the display unit 101. At this point, the CPU 401 of the printing apparatus 100 determines whether there is the printing data in the next scanning range (in this case, the second scanning range 211) in S701 in the flowchart in FIG. 8. If there is no printing data in the second scanning range 211, in S705, the state of the printing apparatus 100 is switched to the line break waiting state (third state) again, and the second to the fourth display units 101b to 101d in the display unit 101 are lighted up. With the display of the display unit 101, the user recognizes that it is necessary to make a line break further. Subsequently, once the user makes a line break again, there is found the data in the third scanning range 212; accordingly, the state of the printing apparatus 100 is switched to the first state (printable state) by the processing of S703 in the flowchart in FIG. 8. The user can recognize the change in the state from the display of the display unit 101. Thereafter, in accordance with the display of the display unit 101, the user scans the printing apparatus 100 in the left direction to print the image into the third scanning range 212 as illustrated in FIG. 13D. The printing into the fourth scanning range 213 is performed as with FIG. 12B. Thus, in the present embodiment, even in a case where there is a blank in a single image, the user is able to properly perform the scanning and the making of a line break by the printing apparatus 100 with no hesitation.

Figure 14A:
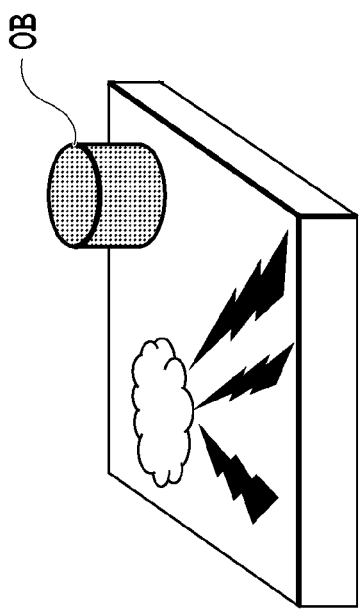
FIGS. 14A to 14C are diagrams illustrating scanning performed by a conventional printing apparatus in a case where there is an obstacle on a printing medium.
Figure 14B:
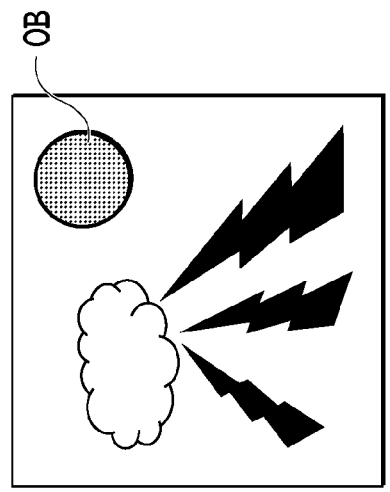
Figure 14C:
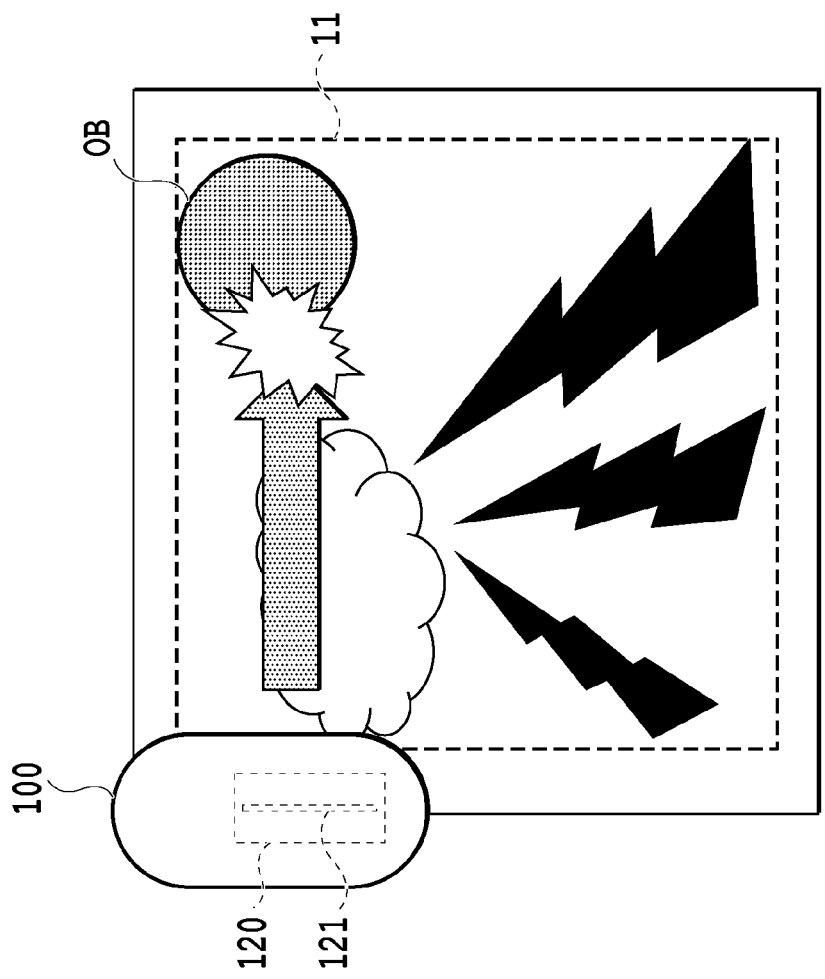

From the nature thereof, the handheld printing apparatus is able to eject the ink and print the image by scanning on a surface of any type of medium. For this reason, for example, it is considered that the handheld printing apparatus is used to print an image onto a surface of a box or a workpiece. In this case, there is a possibility that the printing medium is not in a complete rectangular. For example, in a case of forming an image as illustrated in FIGS. 14A and 14B, in a case of scanning the printing apparatus 100 so as to contain a rectangular region with which the image is simply and externally in contact as illustrated in FIG. 14C, the scanning may not be made due to the prevention by an obstacle OB. To the contrary, the scanning may not be made due to a lack in the printing medium. Accordingly, it is difficult for the user to perform the scanning and the making of a line break properly.

Figure 15:
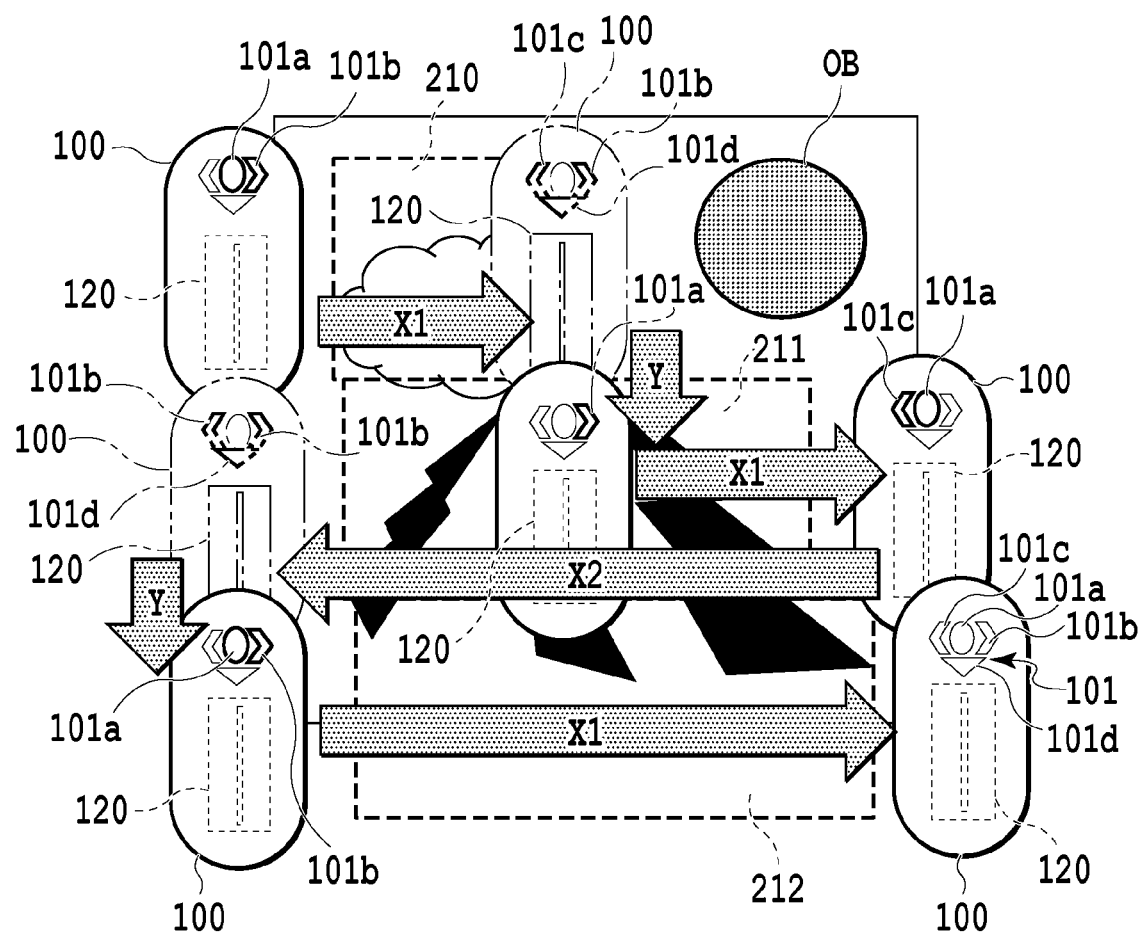
FIG. 15 is a diagram illustrating an example of scanning performed in the present embodiment in a case where there is an obstacle on a printing medium.

However, according to the present embodiment, as illustrated in FIG. 15, the display unit 101 makes instructions to properly perform the making of a line break and the scanning while avoiding an obstacle. In accordance with the contents on the display of the display unit 101, the user is able to properly perform the printing also on a printing medium that is not rectangular. The procedure of the scanning and the making of a line break in a case of printing the image illustrated in FIG. 15 by the printing apparatus 100 of the present embodiment is described below.

In a case of printing the image illustrated in FIG. 15, the user prints the image into the first scanning range 210 by scanning the printing apparatus 100 in the X1 direction in accordance with the lighting-up of the first display unit 101a and the second display unit 101b of the printing apparatus 100. Once reaching the end portion of the first scanning range 210, the display of the display unit 101 is switched to the lighting-up of the second to the fourth display units 101b to 101d to prompt the user to make a line break. In this process, the user moves the printing apparatus 100 in the Y direction in accordance with the display of the display unit 101, and stops the printing apparatus 100 at a point at which the display is switched to the display of only the second display unit 101b. With this, the printing apparatus 100 makes a line break to enter the second scanning range 211. With the line break, the printing head 120 of the printing apparatus 100 is positioned within the second scanning range. For this reason, the display unit 101 of the printing apparatus 100 is switched to the display indicating the printing preparation state (second state). In this process, only the second display unit 101b is lighted up.

Thereafter, the user moves the printing apparatus 100 in the X1 direction in accordance with the display of the display unit 101 (lighting-up of the second display unit 101b). Since the scanning is performed in the printing preparation state, no printing operation is executed. At a point at which the printing head 120 of the printing apparatus 100 goes beyond the right end of the second scanning range 211, the display of the display unit 101 is switched to the display indicating the printable state (the first display unit 101a and the third display unit 101c are lighted up). Next, in accordance with the display of the display unit 101, the user scans the printing apparatus 100 in the X2 direction to print the image into the second scanning range 211. Once the printing head 120 of the printing apparatus 100 is moved to the outside the left end of the second scanning range 211, the display unit 101 is switched to the display indicating the line break waiting state. In other words, the first display unit 101a is lighted out, and the second to the fourth display units 101b to 101d are lighted up.

Thereafter, in accordance with the display of the display unit 101, the user makes a line break by moving the printing apparatus 100 in the Y direction. Once the printing apparatus 100 reaches the line break position, the display of the display unit 101 is switched to the display indicating the printable state. In this process, the first display unit 101a and the second display unit 101b are lighted up. Accordingly, in accordance with the display of the display unit 101, the user moves the printing apparatus 100 in the X1 direction to print the image into the third scanning range 212. Once the printing of the image is completed, the first to the fourth display units 101a to 101d are all lighted out to make the user recognize that the printing operation is completed.

As described above, according to the present embodiment, with the printing apparatus 100 being moved in accordance with the display of the display unit 101, it is possible to properly perform the scanning and the making of a line break and to improve the operability of the handheld printing apparatus 100.

In the above-described embodiment, there is described an example in which the printing is performed with completely no overlapping of the scanning ranges 210 to 213 with each other; however, it is not limited thereto. As long as the data to be printed by one scanning and the positional information of the left and right ends and the top and bottom ends of the data are definite, it is also possible to perform the printing while partially overlapping the scanning ranges with each other.

Other Embodiments

In the above-described embodiment, an example in which the operation of making a line break performed between scanning and scanning is performed with the user moving the printing apparatus while checking the display of the display unit 101; however, it is also possible to perform the operation of making a line break by a mechanism for making a line break provided in the printing apparatus. For example, as the mechanism for making a line break, there may be considered a mechanism in which, with an instruction by the user to make a line break, the printing apparatus main body including the printing head is raised to be away from the printing medium, and after a predetermined amount of movement in a direction crossing the ejection port array of the printing head (typically, an orthogonal direction (Y direction)), the printing apparatus main body is lowered to the printing medium. For the movement of the printing apparatus main body, operation force by the user may be a driving source, or a power source such as a motor may be used. For the detection whether a line break is made by the mechanism for making a line break, a dedicated detection unit may be provided, or positional information from the above-described head position sensor may be used. In any case, the CPU 401 executes the processing of the flowchart illustrated in FIG. 8 based on information indicating that the operation of making a line break by the mechanism for making a line break is executed. With this, it is possible to perform processing similar to that of the above-described embodiment.

With a use of the above-described mechanism for making a line break, it is possible to avoid a contact between the printing apparatus and the printing medium during the operation of making a line break in the scanning range of an image, and it is possible to suppress a damage of the printing image. Additionally, with a use of the mechanism for making a line break, it is possible to correctly make a line break by a constant amount, and thus it is possible to improve the operability of the handheld printing apparatus. In a case of using a power source such as a motor as the mechanism for making a line break, it is also effective to provide a lock unit to prevent the execution of the operation of making a line break in a case where the user makes an instruction to make a line break in a state other than the line break waiting state (third state). With this, it is possible to prevent the making of a line break due to an incorrect operation by user, and the operability is further improved.

In the above-described embodiment, there is described an example in which the position of the printing apparatus 100 is determined and the display control is performed in the printing apparatus 100; however, it is not limited to the example. For example, the position of the printing apparatus 100 may be transmitted real-time to an external apparatus. The control illustrated in FIGS. 7 and 8 may be performed by the external apparatus. As a control result, each state may be transmitted from the external apparatus to the printing apparatus 100, and the printing apparatus 100 may perform a display control in accordance with the transmitted state. Otherwise, the external apparatus may directly perform the display control itself of the printing apparatus 100.

Embodiment(s) of the present invention can also be realized by a computer of a system or apparatus that reads out and executes computer executable instructions (e.g., one or more programs) printed on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125889 filed Jul. 30, 2021, which is hereby incorporated by reference herein in its entirety.

What is claimed is:

1. A printing system, comprising:
a printing apparatus main body that includes a printing unit that performs printing on a printing medium;
a movement detection unit that detects scanning, which is movement of the printing apparatus main body in a first direction, and an operation of making a line break, which is movement in a second direction crossing the first direction; and
a notification unit that selectively makes (1) a first notification that prompts scanning along with printing by the printing unit, (2) a second notification that prompts scanning along with no printing by the printing unit, and (3) a third notification that prompts the operation of making a line break, in accordance with a detection result of the printing unit,
wherein the notification unit includes a display unit provided in the printing apparatus main body so as to be visually recognizable,
wherein the first direction includes a first scanning direction and a second scanning direction opposite to the first scanning direction,
wherein the display unit includes (1) a first display unit that indicates that the printing unit is in a printable state, (2) a second display unit that prompts scanning of the printing apparatus main body in the first scanning direction, (3) a third display unit that prompts scanning of the printing apparatus main body in the second scanning direction, and (4) a fourth display unit that prompts movement of the printing apparatus main body in the second direction, and
wherein the display unit makes the first to the third notification with combinations of display states of the respective first to fourth display units.

2. The printing system according to claim 1, wherein the notification unit selectively makes the first to the third notification in accordance with a position in the first direction of the printing apparatus main body in each of a case where the scanning of the printing apparatus main body is detected and a case where the operation of making a line break is detected by the movement detection unit.

3. The printing system according to claim 1, wherein the notification unit is provided in the printing apparatus main body.

4. The printing system according to claim 1, wherein the printing unit is provided in a position facing the printing medium in the printing apparatus main body, and
wherein the movement detection unit detects movement in the first direction and movement in the second direction of the printing unit by detecting the scanning and the operation of making a line break by the printing apparatus main body.

5. The printing system according to claim 1, wherein the display unit makes the first notification by lighting-up the first display unit, lighting-up the second or the third display unit, and lighting-out the fourth display unit,
wherein the display unit makes the second notification by lighting-out the first or the fourth display unit and lighting-up the second or the third display unit, and
wherein the display unit makes the third notification by lighting-out the first display unit and lighting-up the second to the fourth display units.

6. The printing system according to claim 1, wherein the movement detection unit detects a movement amount of the printing apparatus main body in the first direction and a movement amount of the printing apparatus main body in the second direction and detects execution of the operation of making a line break at a point at which the movement amount of the printing apparatus main body in the second direction reaches a predetermined amount.

7. The printing system according to claim 6, wherein at the point at which the movement amount of the printing apparatus main body in the second direction reaches the predetermined amount, the notification unit is switched from the third notification to the first notification or the second notification to provide notification of execution of the operation of making a line break.

8. The printing system according to claim 1, further comprising:
a mechanism for making a line break that moves the printing apparatus main body along the second direction by a predetermined amount.

9. The printing system according to claim 8, wherein the mechanism for making a line break raises the printing apparatus main body from a printable position in which printing on the printing medium is possible and thereafter moves the printing apparatus main body in the second direction by a predetermined amount to move to a printable position again.

10. The printing system according to claim 9, wherein the mechanism for making a line break further includes a lock unit that prevents execution of the operation of making a line break while the first or the second notification is made.

11. The printing system according to claim 1, wherein the notification unit includes a sound output unit that notifies of a state of the printing apparatus main body by sound.

12. The printing system according to claim 1, wherein in addition to the first to the third notification, the notification unit makes a fourth notification to notify of a state in which printing is all completed.

13. A method of controlling a printing system that performs printing by moving a printing apparatus main body that includes a printing unit that performs printing on a printing medium, comprising the steps of:
a detecting scanning step of detecting a scanning, which is movement of the printing apparatus main body in a first direction, and an operation of making a line break, which is movement in a second direction crossing the first direction; and
a notification step of selectively making (1) a first notification that prompts scanning along with printing by the printing unit, (2) a second notification that prompts scanning along with no printing by the printing unit, and (3) a third notification that prompts the operation of making a line break, in accordance with a detection result of the printing unit,
wherein the notification step includes a displaying step of displaying on the printing apparatus main body so as to be visually recognizable,
wherein the first direction includes a first scanning direction and a second scanning direction opposite to the first scanning direction, and
wherein the displaying step includes selectively carrying out (1) a first display step that indicates that the printing unit is in a printable state, (2) a second display step that prompts scanning of the printing apparatus main body in the first scanning direction, (3) a third display step that prompts scanning of the printing apparatus main body in the second scanning direction, and (4) a fourth display step that prompts movement of the printing apparatus main body in the second direction, such that the displaying step makes the first to the third notification with combinations of display states of the respective first to fourth display steps.

14. A non-transitory computer-readable storage medium storing a program for causing a computer to perform a method of controlling a printing system that performs printing by moving a printing apparatus main body that includes a printing unit that performs printing on a printing medium, the method comprising the steps of:
a detecting scanning step of detecting a scanning, which is movement of the printing apparatus main body in a first direction, and an operation of making a line break, which is movement in a second direction crossing the first direction; and
a notification step of selectively making (1) a first notification that prompts scanning along with printing by the printing unit, (2) a second notification that prompts scanning along with no printing by the printing unit, and (3) a third notification that prompts the operation of making a line break, in accordance with a detection result of the printing unit,
wherein the notification step includes a displaying step of displaying on the printing apparatus main body so as to be visually recognizable,
wherein the first direction includes a first scanning direction and a second scanning direction opposite to the first scanning direction, and
wherein the displaying step includes selectively carrying out (1) a first display step that indicates that the printing unit is in a printable state, (2) a second display step that prompts scanning of the printing apparatus main body in the first scanning direction, (3) a third display step that prompts scanning of the printing apparatus main body in the second scanning direction, and (4) a fourth display step that prompts movement of the printing apparatus main body in the second direction, such that the displaying step makes the first to the third notification with combinations of display states of the respective first to fourth display steps.

* * * * *